UNITED STATES PATENT OFFICE.

ZACHARIAH CARTWRIGHT, OF ILFORD, ENGLAND.

METHOD OF OBTAINING SOLUTIONS OR QUASI SOLUTIONS OF CERTAIN METALLIC OXIDS.

988,692. Specification of Letters Patent. Patented Apr. 4, 1911.

No Drawing. Application filed June 29, 1909. Serial No. 505,045.

*To all whom it may concern:*

Be it known that I, ZACHARIAH CARTWRIGHT, a subject of the King of Great Britain, and resident of Ilford, Essex, England, have invented a Method of Obtaining Solutions or Quasi Solutions of Certain Metallic Oxids, of which the following is a specification.

This application relates to a method of obtaining solutions or quasi solutions of oxids of metals contained in the iron group, viz., iron, manganese, and chromium which are insoluble in water and other media chemically indifferent to said oxids.

In a separate application filed January 12, 1910, bearing Serial No. 537,763, entitled "Method of obtaining solutions or quasi-solutions of certain metallic oxids," I have set forth a novel process of treating metallic oxids, notably those of metal contained in the iron series, viz: iron, manganese, chromium, which are insoluble in water and other media chemically indifferent to the said oxids, and in which alkali is employed as the precipitating agent, for the purpose of obtaining what is virtually a soluble form of certain of these oxids in a chemically inert medium.

According to the method forming the subject of the present application, the metallic oxids are suspended in an aqueous solution of a saponaceous material and thereafter precipitated by the addition of an acid.

It is to be understood that although in the following description for the sake of convenience I refer to the mixture of oxid and the saponaceous menstruum as a "solution", I mean to imply not that it is a solution in the strict sense of the term, but that it is a mixture so intimate that its constituent elements will pass through filter paper together with the soluble fatty acids without separation. Similarly, the term "soluble" as applied to the oxids is not to be understood in its strict sense, but in the sense corresponding to the above definition.

Although the novel menstruum I employ may, broadly speaking, be said to consist of an extremely dilute aqueous solution of soap, I wish it to be understood that I include in the term "soap", resin-soap, and aqueous solutions of fatty acids with a sufficiency of alkali to hold the fatty acids in solution. Too great an excess of alkali must be avoided, otherwise more or less rapid precipitation of the oxids ensues. A certain proportion of unsaponified fats or glycerin may be present in the soap solution without detriment to the process.

In the manufacture of "mottled" soap, it is well known that if iron oxid be employed to produce the "mottling", the greater the proportion of water present the more rapidly does the iron oxid sink to the bottom of the semi-fluid mass. This still holds good for high degrees of dilution of the soapy matter corresponding to 80 or 90 per cent. of water. I have discovered, however, that at a point of still more extreme dilution, contrary to what would have been expected, a reversal of this effect manifests itself, experiment showing that a critical point is reached corresponding to a concentration of about 5% of soapy matter beyond which further dilution with water results in a decrease in the rapidity of precipitation.

The increase in what, as above stated, may, for convenience sake, be called the solubility of the oxid, consequent on further dilution, is very rapid, a maximum being reached between the limits of 1 and 0.5% concentration. If the soap solution be of 1% concentration, precipitation of the oxid practically ceases, *i. e.* the oxid will remain suspended in, or distributed throughout, the soap solution for a practically unlimited period without any perceptible tendency to become deposited under the action of gravity.

The above applies to other oxids besides those of iron, for instance, those of chromium and manganese. It is, however, only the hydrated oxids which are soluble (using this term in the sense above indicated), the so-called solubility increasing with the degree of hydration specific gravity evidently being the determining factor. Since the color of these oxids also depends upon their hydration (the color passing through progressively darker shades when an oxid is dehydrated by ignition) it will be seen that, by employing a menstruum of a given predetermined strength certain one or more lighter (and consequently more brightly colored) oxids can be separated from the heavier (*i. e.* darker) ones by virtue of the selective solvent action exercised upon them by the menstruum. I have, therefore, discovered a novel menstruum for iron and certain other oxids, which, for many purposes, may be regarded practically as water, consisting as it does of an extremely dilute aqueous solution of the comparatively inert substance soap, and being therefore a very innocuous vehicle or medium for conveying the oxid. It will be evident that by the use of this menstruum these bodies may be applied to many purposes to which they were hitherto, in the absence of such a menstruum, inapplicable. From this solution the oxids are easily precipitated by the addition of a small quantity of an acid, the oxids being then precipitated with the fatty acid with which they were associated. The presence of the fatty acids, if of a drying oil, in the precipitate obtained, is not disadvantageous for many purposes, such as color manufacture.

In applying my invention to the removal of impurities such as silica, from a hydrated oxid such as the yellow and the bright red oxid of iron (but not the purple or the black oxid that do not contain a relatively high percentage of combined water) or of manganese, or of chromium, I may proceed as follows: I suspend the finely levigated impure oxid in the prepared menstruum with mechanical stirring. The strength of the menstruum may be anything between the limits, say, of 5 to 0.5%.

The mixture obtained as above is allowed to stand, whereupon the impurities, both those such as silica associated with the oxid and those in the water, will precipitate. Too much oxid should, of course, not be introduced into the solution, i. e. not so much as to appreciably affect the fluidity of the mixture, otherwise satisfactory separation will not be obtained. I find 7% of oxid to be about the maximum for good results. As soon as this precipitation has ceased the solution, containing the oxid and a certain amount of the more soluble impurities, is decanted off into another vessel, and a small quantity of acid is then added to it, whereupon precipitation of the oxid (or more strictly speaking, the mixture of oxid and fatty acids) at once commences. The liquid is then run off and the precipitate washed.

The above operations may be repeated if desired, successive operations yielding a purer or more finely divided precipitate of oxid. The above constitutes a ready and inexpensive method of purifying metallic oxids to be employed in the manufacture of paint and the like.

In order to illustrate what the strengths of the menstruum mean, I will describe what I mean by, say, a 1% menstruum: Dissolve one pound of caustic soda or caustic potash in about eight pounds of water, then take one pound of rosin, grease, or oil and warm it until liquid, then pour it slowly into the alkali solution, stir up until well mixed and allow to stand for about seven days, after which boil up and add slowly further water until a quite clear solution is obtained in 198 pounds of water. This I call a 1% solution.

My invention finds its most important application in the partial separation (according to color) of mixed oxids from one another, with the ultimate object of applying them as pigments to the manufacture of paints and the like. Although for the reasons hereinafter specified, it is not practicable, according to the process, the subject of my invention, to absolutely separate any required oxid from those others with which it is associated (and which may differ from it either according to the nature of the metals concerned or in their respective percentages of combined water) so as to obtain a single pure oxid of definite composition, nevertheless this is of small consequence, the object in view being simply the assortation of the oxids according to shade so as to obtain samples of the brightest shades suitable for the manufacture of paints.

The process may be described as an empirical one, the problem being to obtain from any given specimen of mixed oxids, a sample or series of samples of mixed oxids of any required shade (the shade being determined by the varying preponderance of the lighter and darker oxids), while the method adopted depends upon the fact that from a solution of the mixed oxids precipitation of the different oxids present takes place in the order of their respective specific gravities. By this I do not mean simply that precipitation of all the oxids present goes on simultaneously, only with varying rapidity, but that for a given predetermined strength of the menstruum, certain oxids will be thrown down and other will remain behind in solution. As a matter of fact, however, rapidity of precipitation does play an important part in the action, that is to say there is no sharply defined limit determining precipitation of one oxid only or alternatively of that oxid and also the next in order of specific gravity, the reality being that as a given limit is approached not only does the rapidity of precipitation of the heavier oxid increase, but the next in order of gravity also commences to precipitate until when the limit is actually reached both oxids are precipitated with practically equal rapidities. Hence it will be seen that by the application of this principle it is possible to obtain, from a given specimen of mixed oxids, an infinite number of samples containing progressively increasing proportions of an oxid of any given specific gravity. Since the color of these oxids is darker according as the specific gravity and percentage of combined water is higher, it will be evident that any shade may be obtained within the range of colors presented by the oxids dealt with. In the case of iron and manganese, however, the specific gravities of oxids containing corresponding percentages of oxygen and of combined water do not permit of complete separation by the application of this method.

In carrying out the assortation process I proceed as follows:—Suppose it is required to prepare a sample of mixed oxids of an orange-yellow shade. This shade will, of course, correspond with a certain high percentage of the lighter oxids, the numerical value of this percentage being, however, of no immediate consequence. The object is to obtain a menstruum of such strength as will dissolve the oxid of lighter color and that proportion of the darker oxids, the presence of which is necessary to impart the shade required to the mixture of oxid dissolved. When a solution of the required shade is obtained, it is run off and if the color is required for the preparation of paint or the like, the whole of the oxids contained in this solution are thereafter precipitated, washed, and dried and are then ready for the market. In carrying out this process I proceed according to a method of "trial and error", i. e., employing a small test sample of oxid I commence with a weak menstruum and gradually increase its strength until one of the correct strength is obtained.

It will be observed that, in the foregoing example, the process is worked by "progressive solution". The details of the process are as follows:—I first prepare a menstruum of sufficient strength to dissolve all the oxids contained in the specimen to be treated. This menstruum (which I will refer to as the standard solution) may be of a strength, say of 2%, the precise meaning which this strength implies having been above explained. From this standard solution I then prepare a small quantity of a solution of a strength insufficient to dissolve any of the oxids, and thereafter increase its strength until it is found to hold such of the oxids in solution as will give the shade required. When a test solution of the required strength has been obtained, its strength can be easily calculated from the proportions of water and standard solution employed. A quantity of the menstruum of the required strength can then be prepared for the purpose of obtaining a pigment of the required shade from the specimen of commercial oxid submitted. All that is necessary is to decant off the solution of color and to thereafter precipitate it with acid, care being taken that only the requisite quantity of precipitant is employed.

Owing to the fact that no two specimens of commercial oxid can ever be relied upon to possess the same uniform composition, and that moreover no satisfactory method is known of determining such percentage composition, it will be found necessary always to proceed in the above manner by operating first with a test solution. Furthermore, since the foregoing remarks apply with equal force to the soap supplied in commerce (i. e. the percentage of fatty acids and alkali obtainable in solution from any given specimen of soap being indefinite) and moreover, the hardness of the water employed being also a factor which must be taken into consideration, I find it necessary to prepare the soap solution according to the special process above described.

If it be desired to prepare a permanent solution of an oxid, it is only necessary to employ a menstruum of the maximum solvent power. By this means the insoluble impurities are at once precipitated, whereupon the solution of metallic oxid may then be decanted off and be preserved indefinitely. To obviate the consequences of such an excess of alkali in the menstruum as would cause gradual precipitation, advantage may be taken of the fact that certain organic substances, such as sugar, tend to prevent the precipitation of ferric oxid by alkalies.

I claim—

1. A method of separating certain metallic oxids, consisting in placing the said oxids in an aqueous solution having not less than 0.5% of a saponaceous material; then increasing the percentage to obtain the desired color; then precipitating the oxids in said solution by the addition of an acid; and then decanting the liquid.

2. A method of separating certain metallic oxids, consisting in placing metallic oxids in an aqueous solution containing not more than 5% of a saponaceous material; then precipitating the said oxids out of said solution by the addition thereto of an acid; and then decanting the liquid.

ZACHARIAH CARTWRIGHT.

Witnesses:
 EDWIN GEORGE WHITE,
 ROSE ISABEL PAGE.